United States Patent
Moji

[11] Patent Number: 5,924,895
[45] Date of Patent: Jul. 20, 1999

[54] CAR PLUG

[76] Inventor: Eiro Moji, Wing 305, 2-20-2, Minami Daira, Mizuho-machi, Nishi Tama-gun, Tokyo, Japan

[21] Appl. No.: 08/980,293

[22] Filed: Nov. 28, 1997

[30] Foreign Application Priority Data

Jan. 8, 1997 [JP] Japan ................................. 9-013118

[51] Int. Cl.⁶ ................................................ H01R 17/18
[52] U.S. Cl. ............................................................ 439/668
[58] Field of Search ..................................... 439/668, 218, 439/669, 621, 622

[56] References Cited

U.S. PATENT DOCUMENTS

| | | | |
|---|---|---|---|
| 5,263,879 | 11/1993 | Sasa et al. | 439/668 |
| 5,482,468 | 1/1996 | Bolin | 439/668 |
| 5,775,952 | 7/1998 | Lu | 439/668 |

Primary Examiner—Gary Paumen
Attorney, Agent, or Firm—Browdy and Neimark

[57] ABSTRACT

A support member to support elastic terminals is incorporated in a body so that the support member is made slidable in the longitudinal direction of the body. The support member has higher and lower base surfaces provided longitudinally in parallel to each other on the outer surface of the support member to support the elastic terminals. Also, the support member is biased by a spring so that the support member is pushed forward. An operating member integrated with or integrally connected with the support member so as to make a slide motion in the longitudinal direction is incorporated with the outer surface of the body such that the front end of the operating member is located ahead of terminal portions of the elastic terminals projected from the body, and the height of projected terminal portions of the elastic terminals is automatically switched over by the operation of inserting the car plug into a socket for a cigar lighter.

2 Claims, 6 Drawing Sheets

CAR PLUG

BACKGROUND OF THE INVENTION

1. Field of the Invention

This invention relates to an improved car plug used to derive power by utilizing a socket, which is a jack portion for a cigar lighter mounted in a cabin of an automobile, to derive power by inserting a plug used to derive power, instead of the cigar lighter, into the socket after removing the cigar lighter from the socket.

2. Description of the Prior Art

A socket 1 for a cigar lighter mounted in a cabin of an automobile is assembled as follows. That is, as shown in FIG. 1, a cylindrical body 10 serving as an outside electrode is made of a metal material, an axial rod-like inside electrode 11 is incorporated integrally with the bottom of the body through an insulating material 12, a hold piece 13 to hold an inserted cigar lighter is incorporated with the inner end side of the inside electrode 11, a cord holder 15 is incorporated by the use of a nut 16 with an outer end portion of the inside electrode 11 projected from the outer surface of the bottom of the body 10 through an insulating material 14, and an earthing conductor connected to the body 10 and a cord 17 connected to the inside electrode 11 are held by the cord holder. Then, the socket 1 thus assembled is incorporated in a vehicle body.

A car plug A inserted into the socket to derive power is assembled as follows. That is, as shown in FIG. 2, an inside electrode terminal 3 is incorporated with the top side of an axially cylindrical body 2 made of an insulating material, one of cords 40, 40 inserted into the body 2 from its tail end side is connected to the inside electrode terminal through a fuse 30, elastic terminals 5, 5 serving as outside electrodes are fitted in the body 2, terminal portions 50, 50 at the top side of the elastic terminals are projected from the outer surface of the body 2 through window holes 20, 20 provided in a peripheral wall of the body 2, and the tail ends of the elastic terminals are connected to the other cord 40. Thus, when the car plug A is inserted into the socket 1, the inside electrode terminal 3 at the top of the body of the car plug is brought into contact with and connected to the inside electrode 11 at the bottom of the body 10 of the socket 1, and the terminal portions 50, 50 projected from the outer surface of the body 2 are brought into contact with and connected to the inner surface of the cylindrical body 10 of the socket 1. As a result, the car plug is used to derive power through the cords 40, 40.

In the socket 1 for the cigar lighter mounted in a body of an automobile, the body 10 is standardized to have the same inside diameter in Japanese automobiles and U.S automobiles. However, a socket 1' in European automobiles such as Mercedes-Benz is formed to have a somewhat larger inside diameter (by an extent of about 1 mm) as shown in FIG. 3.

Thus, when the car plug A produced to be adapted for Japanese automobiles so as to derive power is inserted into the socket 1' in European automobiles to make an attempt to derive power, the terminal portions 50, 50 of the car plug A are brought into insufficient contact with the inner surface of the body 10 of the socket 1', and as a result, there are generated problems of a drop of the inserted car plug A out of the socket 1', or failure of electrical contact between the terminal portions 50, 50 and the body 10.

In view of the above problems, the car plug A has a following structure. That is, a support member a is provided in the body 2 of the car plug to support the elastic terminals 5 so as to project the terminal portions 50 through the window holes 20 of the body 2. Further, the support member a is axially supported by a rotary shaft b rotated by the operation performed outside the body 2, so that a position to support the elastic terminals is varied in the radial direction of the body 2 through rotation of the rotary shaft as shown in FIG. 4, and the height of each terminal portion 50 projected from the window hole 20 is switched over between higher and lower levels through switch-over of the support position to cope with a variation of the inside diameter of the body 10 in the socket 1.

When the conventional car plug A described above is inserted into the socket 1' of a large diameter in European automobiles, the elastic terminals 5 are supported so as to push a longitudinal intermediate portion of each elastic terminal in the radial direction by rotating the support member a to a position in a state as shown in FIG. 4 through the operation of an operating portion c, and as a result, the terminal portions 50 are projected to a higher position, as shown in FIG. 5. When the car plug A is inserted into the socket 1 of a small diameter in Japanese automobiles, the support member a is released from the elastic terminals 5 by rotating the support member a to a position in a state as shown in FIGS. 2 and 6 through the operation of the operating portion c, and as a result, the terminal portions 50 are projected to a lower position. Thus, the car plug A is adapted for both the socket 1 of the small diameter and the socket 1' of the large diameter. However, the switching operation is troublesome, and it is difficult to confirm the switched state since the support member a, which is provided in the body 2 and not observed from the outside, is rotated and switched over outside the body 2. Thus, there are generated problems in that the car plug is damaged or not pulled out from the socket in case where the car plug is set to be adapted for the socket 1' of the large diameter, and in this state, this car plug is forcibly inserted into the socket 1 of the small diameter.

SUMMARY OF THE INVENTION

The prevent invention is made to overcome the above problems caused in the prior art. It is an object of the present invention to provide a new measure, in which the height of projected terminal portions of spring terminals of a car plug is automatically switched over between higher and lower levels through operation of inserting the car plug into a socket so that the car plug is adapted for sockets different from each other in inside diameter.

According to the present invention, in order to achieve the above object, there is provided a car plug, in which a support member to support elastic terminals is incorporated in a body so that the support member is made slidable in the longitudinal direction of the body; the support member has higher and lower base surfaces provided in the longitudinal direction in parallel to each other on the outer surface of the support member to support the elastic terminals; the support member is biased by a spring such that the support member is pushed forward; an operating member integrated with or integrally connected with the support member to make a slide motion in the longitudinal direction is incorporated with the outer surface of the body such that the front end of the operating member is located ahead of the terminal portions of the elastic terminals projected from the body; and the height of projected terminal portions of the elastic terminals is automatically switched over through operation of inserting the car plug into a socket for a cigar lighter.

According to the measure in the present invention, the support member to support the elastic terminals is incorporated in the body of the car plug so that the support member is longitudinally made slidable in the axial direction of the body of the car plug, whereby the position to support the elastic terminals is switched over between higher and lower positions in the radial direction of the body of the car plug through the longitudinal slide motion of the support member.

At that time, when the support member is slidably moved rearward, that is, toward the tail end side of the body of the car plug, the position of the support member to support the elastic terminals is set at a lower position. On the other hand, when the support member is slidably moved forward, that is, toward the top side of the body of the car plug, the support member is switched over to a higher position. Further, in the normal state, a spring for pushing the support member forward is connected to the support member so that the support member keeps a position resulting from its forward slide motion.

The operating member integrated with or integrally connected with the support member to make a slide motion in the longitudinal direction of the body of the car plug so as to slide the support member is incorporated with the outer surface of the body of the car plug so that the operating member is projected from the outer surface of the body of the car plug. Further, the operating member should be set to have elasticity such that a portion of the operating member projected from the outer surface of the body of the car plug is radially advanced from or retreated into the body of the car plug in response to pressure applied from the outer surface of the body of the car plug.

Thus, when the car plug according to the present invention is inserted into a socket of a large inside diameter in European automobiles, the operating member is fitted into the body of the socket while being held as it is pushed forward, without undergoing any high resistance. Accordingly, the support member integrated with or integrally connected with the operating member is pushed forward by the action of the spring, and holds the state of the elastic terminals supported at the higher position in the radial direction of the body of the car plug. In this state, the terminal portions of the elastic terminals are projected to the higher position. Further, contact pressure of the terminal portions with the inner surface of the body of the socket is firmed, and simultaneously, the terminal portions are surely brought into electrical contact with the inner surface of the body of the socket.

When the car plug is inserted into a socket of a somewhat small inside diameter in Japanese or U.S automobiles, the outer surface of the operating member is blocked in the entrance of the body of the socket, and in this state, the body of the car plug is inserted into the body of the socket with the blocked operating member left behind. In this manner, when the operating member reaches the end of its rearward slide relative to the body, the operating member gets forced into the body of the socket while being forced in the radial direction.

Accordingly, the support member integrated with or integrally connected with the operating member is forced rearward against force of a return spring, and switched over automatically into a state in which the elastic terminals are supported at the lower position in the radial direction of the body of the car plug. Thus, the terminal portions are projected to the lower position, and contact of the terminal portions with the inner surface of the body of the socket of the small diameter is appropriately firmed.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
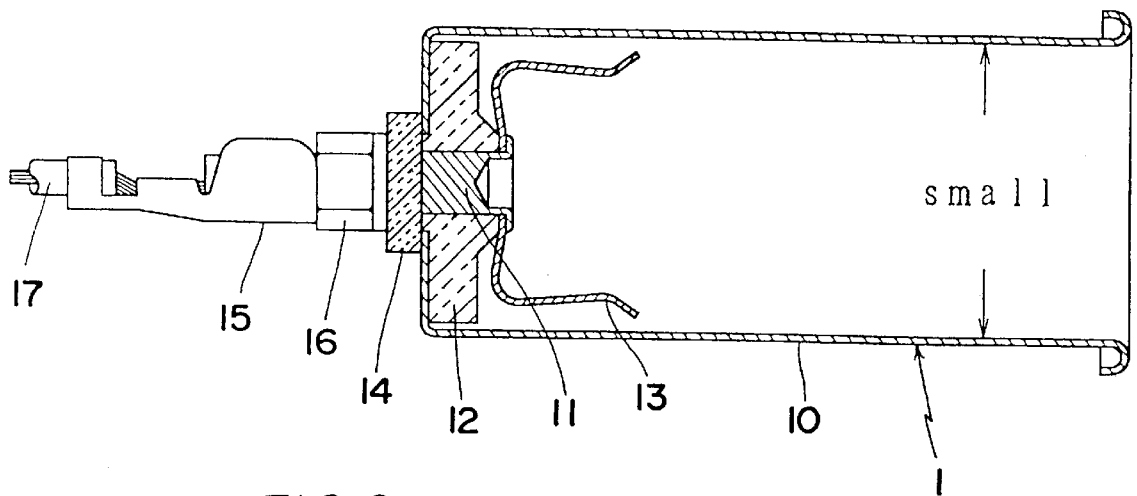
FIG. 1 is a longitudinal sectional view showing a socket of a cigar lighter.
Figure 2:
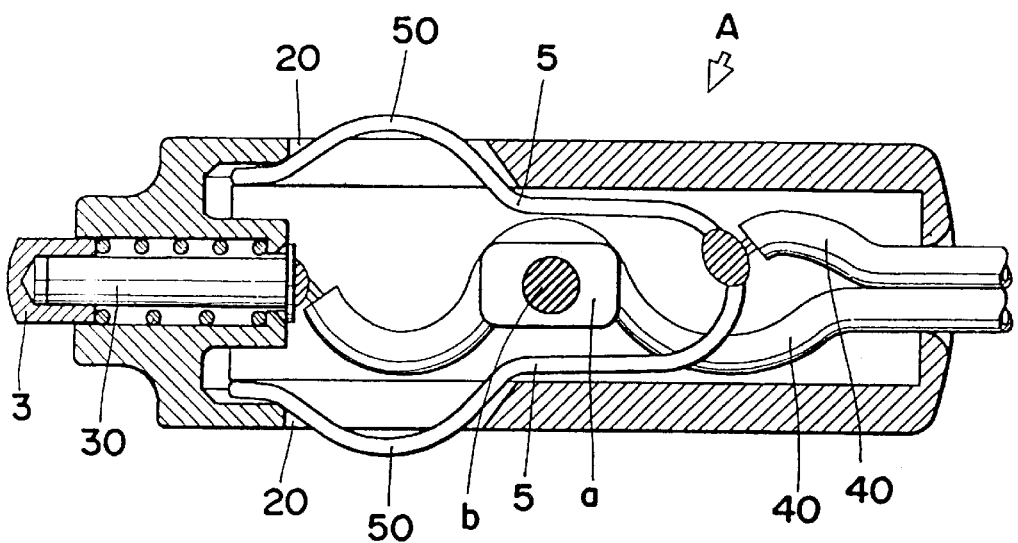
FIG. 2 is a longitudinal sectional side view showing a conventional car plug inserted into the socket of FIG. 1 to derive power.
Figure 3:
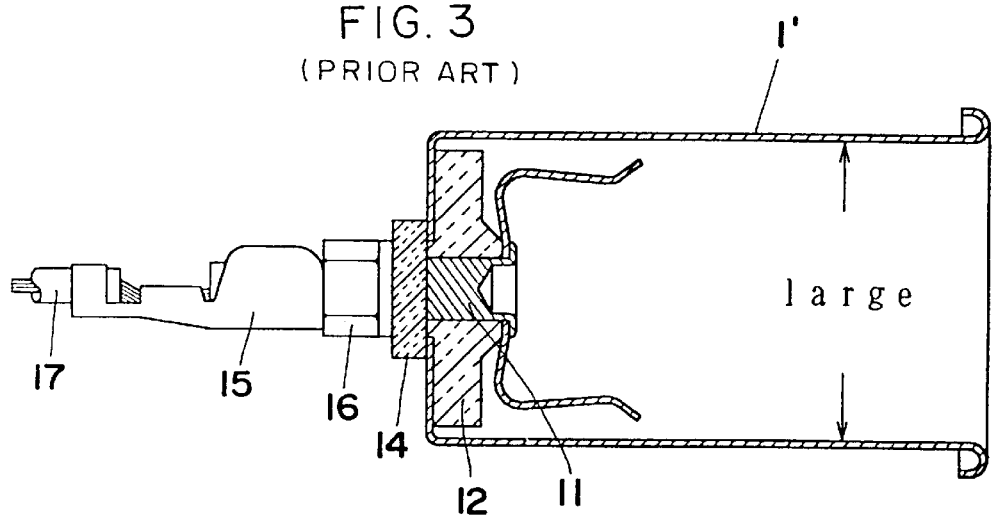
FIG. 3 is a longitudinal sectional side view showing a socket of a cigar lighter in European automobiles.
Figure 4:
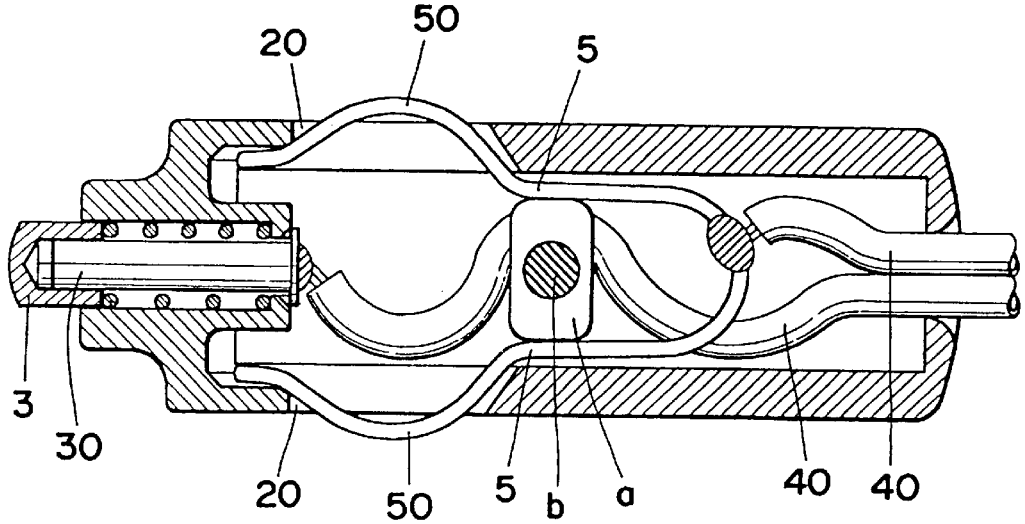
FIG. 4 is a longitudinal sectional side view showing a state, in which a conventional car plug is switched over so as to be adapted for a socket in European automobiles.
Figure 5:
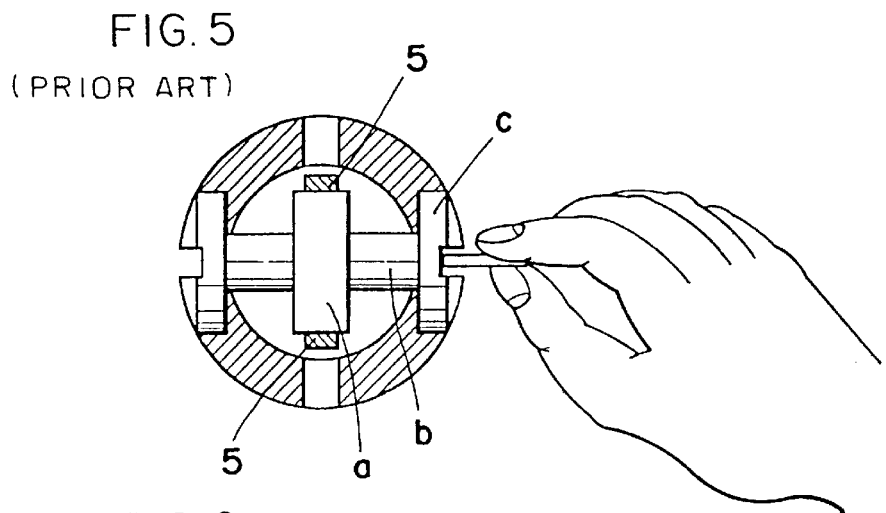
FIG. 5 is a view for explaining a switching means for the car plug.
Figure 6:
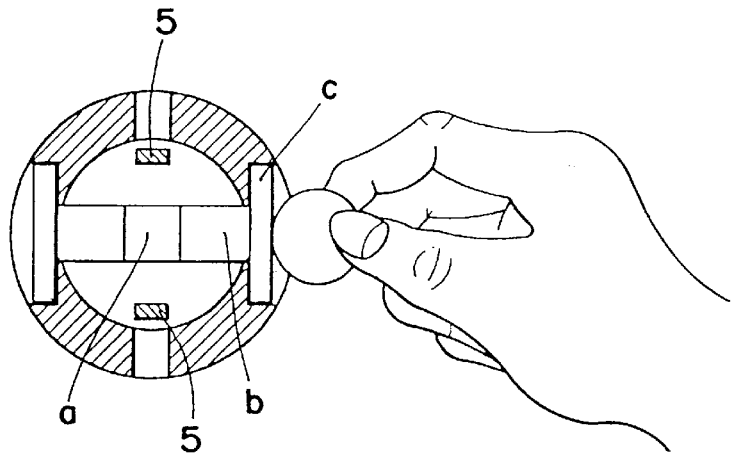
FIG. 6 is a view for explaining operation of switching over a support position of the switching means to a lower position.

In the drawings, the same reference numerals are used for constituent members having effects identical with those of conventional means.

Figure 7:
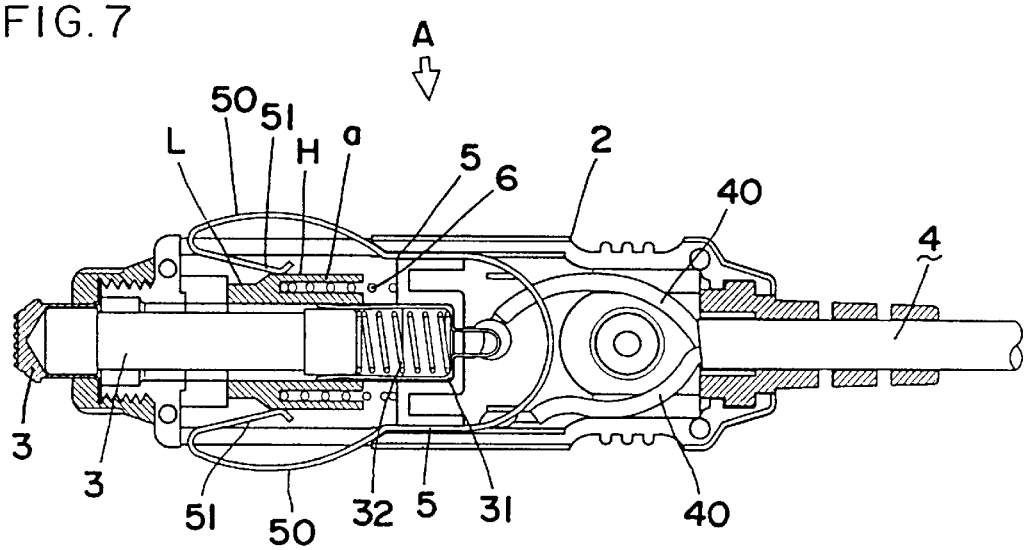
FIG. 7 is a longitudinal sectional side view showing a car plug according to the present invention.
Figure 8:
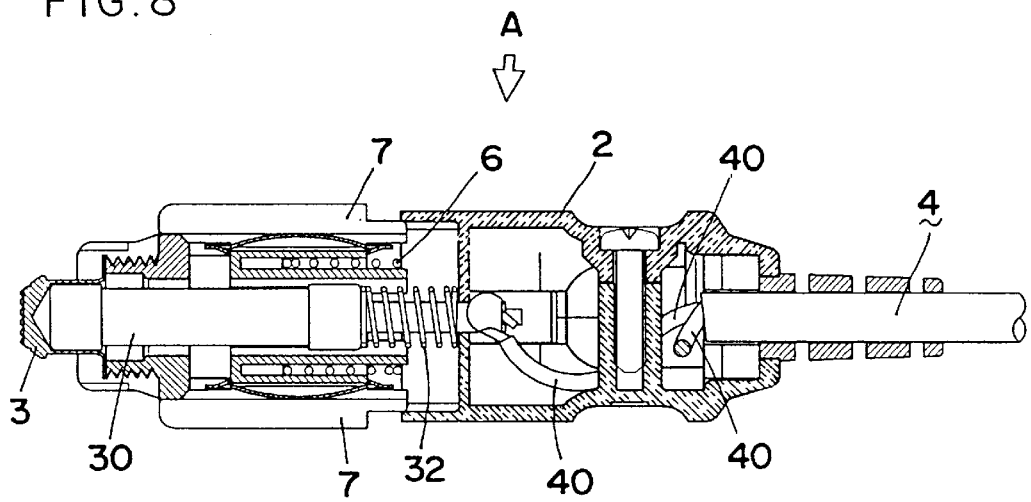
FIG. 8 is a cross-sectional plan view showing the car plug.
Figure 9:
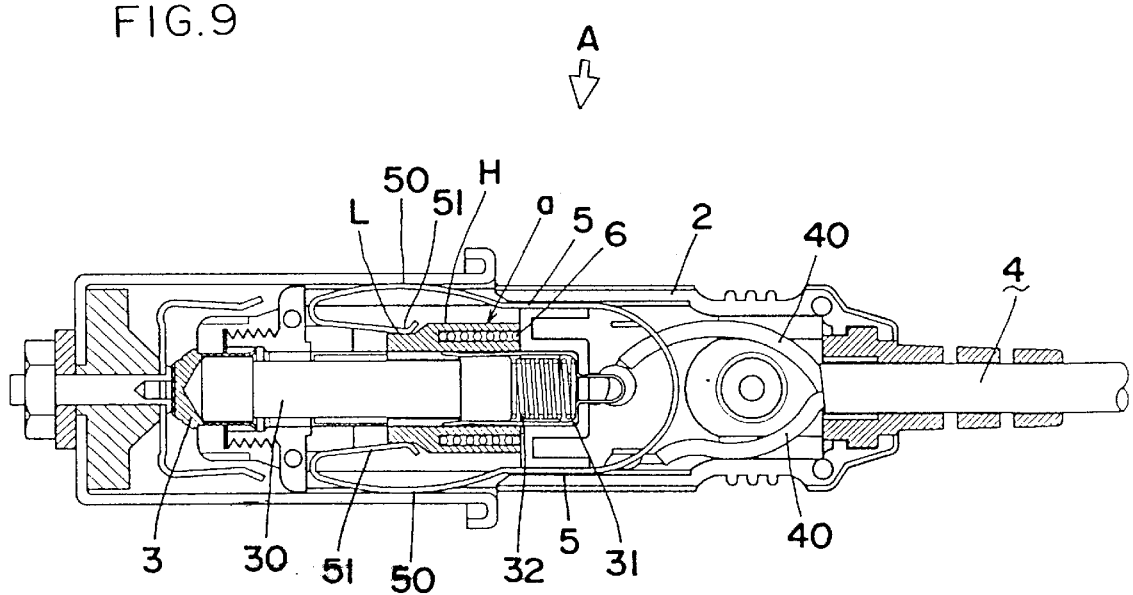
FIG. 9 is a longitudinal sectional side view showing the car plug inserted into a socket of a small diameter.
Figure 10:
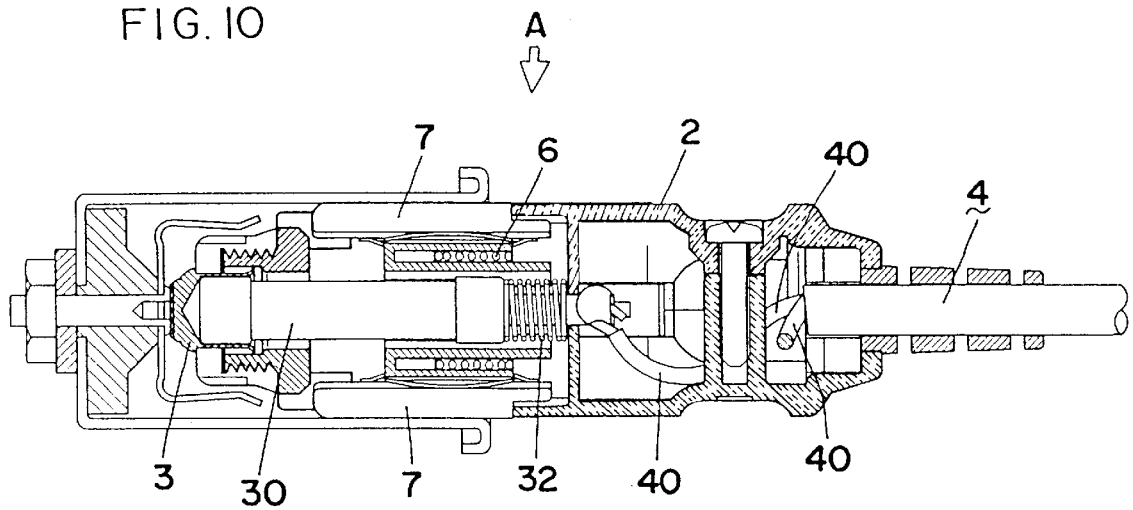
FIG. 10 is a cross-sectional plan view showing the car plug inserted into the socket of the small diameter.
Figure 11:
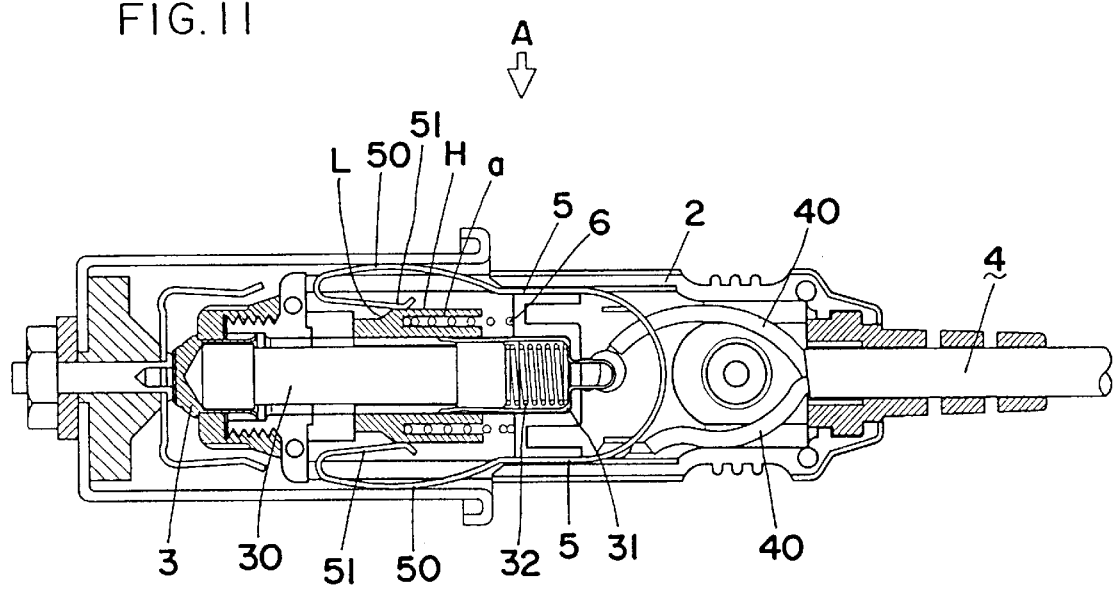
FIG. 11 is a longitudinal sectional side view showing the car plug inserted into a socket of a large diameter.
Figure 12:
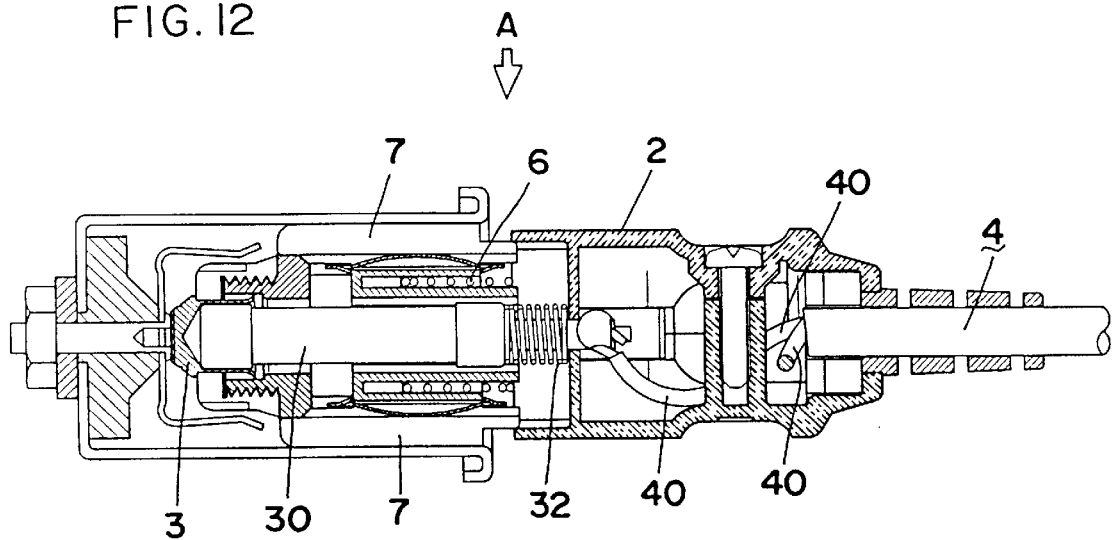
FIG. 12 is a cross-sectional plan view showing the car plug inserted into the socket of the large diameter.

FIG. 7 is a longitudinal sectional side view showing a car plug A according to the present invention, and FIG. 8 is a cross-sectional plan view showing the car plug A. In the drawings, reference numeral 2 denotes a body serving as an insulating member molded in a cylindrical form with a synthetic resin material, 3 is an inside electrode terminal fitted to the top (left end in the drawings) of the body 2, 4 is a cord inserted into the body 2 from its tail end (right end in the drawings), 40, 40 are cord wires for the cords 4, 5, 5 are elastic terminals made of a metal material having elasticity, 50, 50 are terminal portions formed on the tops of the elastic terminals 5, 5, a is a support member incorporated in the body 2, 6 is a spring provided in the body 2 so as to push the support member a forward (leftward in the drawings), and 7 is an operating member incorporated in the body 2 so as to slide the support member a in the longitudinal direction of the body 2.

The inside electrode terminal 3 fitted to the top of the body 2 is incorporated in the body 2 slidably in the longitudinal direction. The front end of a fuse 30 is fitted to the inner end side of the inside electrode terminal 3. A fuse holder 31 made of a conductive metal material and having a cylindrical sleeve form is fixed to an axial core portion in the body 2. The rear end of the fuse 30 is fitted in the fuse holder 31 slidably in the longitudinal direction, and pushed forward by the action of a coil spring 32 provided in the fuse holder 31. Further, the rear end of the fuse 30 is connected to one cord wire 40, which is connected to the rear end of the fuse holder 31, in the cord 4.

According to this embodiment, the elastic terminals 5, 5 made of the elastic metal material and incorporated in the body 2 take the shape of a kick spring, in which a flat spring is bent in the form of a hair pin to provide a pair of elastic terminals 5, 5 continuous with each other on the base end side. The base end side of the elastic terminals is connected to the other cord wire 40 of the cord 4.

The terminal portion 50 formed at the top of each of the elastic terminals 5, 5 is molded in the form of arc so that the terminal portion is projected through a window hole 20 provided in a peripheral wall of the body 2. However, the top of each terminal portion 50 is bent so as to be folded back on the inside of the terminal portion 50. Thus, the free end of a bent piece 51 is brought into contact with a support base formed on the support member a incorporated in the body 2, and as a result, supports each elastic terminal 5 such that the terminal portion 50 is projected to a predetermined height.

The support member a is made of a synthetic resin material, and has an axially cylindrical form so that the support member is fitted to the outer surface of the fuse holder 31. The support member a is incorporated in the body 2 slidably in the longitudinal direction along the outer surface of the fuse holder 31. The front end of the outer surface of the support member a has a base surface L to support the free end of the bent piece 51 at a lower position, and a base surface H to support the free end of the bent piece 51 at a higher position. The lower and higher base surfaces L, H are formed in parallel to each other in two stages in the longitudinal direction, and an inclined surface 60 is formed between the base surfaces L, H.

An annular spring housing 61 is formed on the rear surface side of the support member a, and the support member is biased by the action of a coil spring 6 inserted into the spring housing so that the support member is pushed forward.

The operating member 7 for sliding the support member a is formed on the outer surface of the support member a so as to be integrally continuous therewith, as shown in FIGS. 15 to 21.

Figure 13:
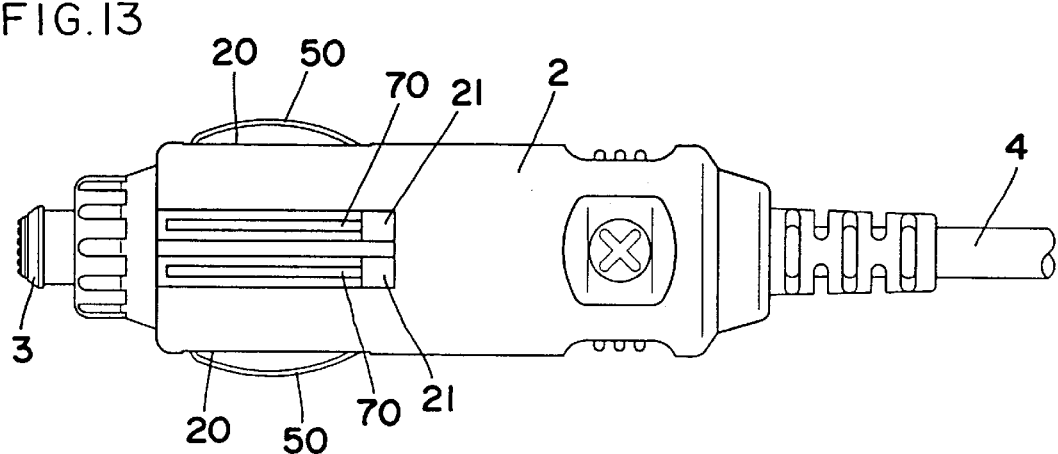
FIG. 13 is a plan view showing the car plug.
Figure 14:
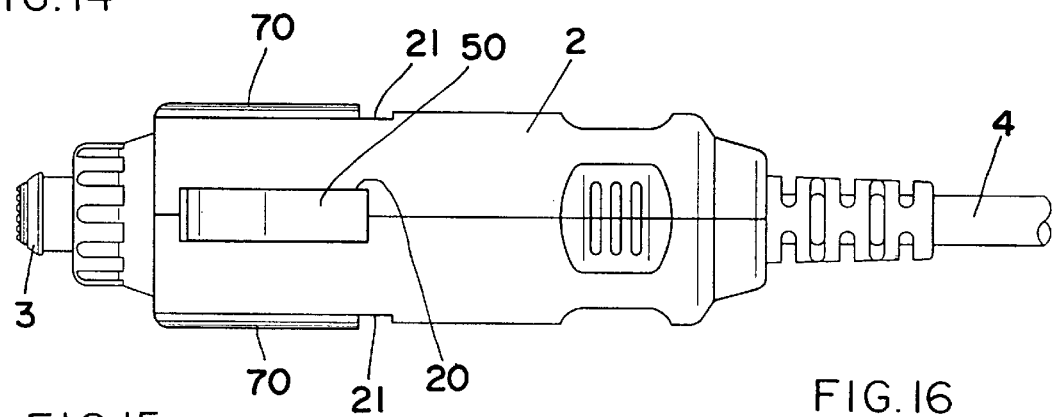
FIG. 14 is a side view showing the car plug.

The operating member 7 is provided on the outer surface of the support member a at a position different in phase by 90° from the base surfaces L, H formed on the outer surface of the support member a, as shown in FIGS. 15 to 21. Thus, as shown in FIGS. 13 and 14, the operating member 7 is structured such that operating portions 70, 70 are projected from the outer surface of the body 2 through window holes 21, 21 provided in the peripheral wall of the body 2 at portions different in phase by 90° from the window holes 20, 20 provided so that the terminal portions 50 are projected therethrough.

Figure 15:
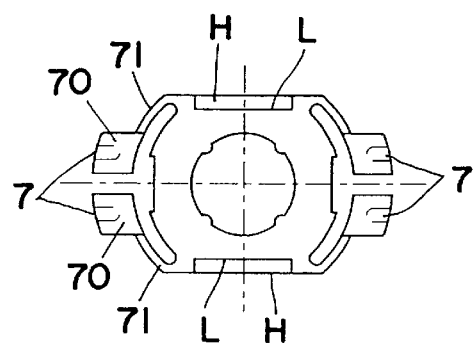
FIG. 15 is a front view showing a support member and an operating member of the car plug.
Figure 16:
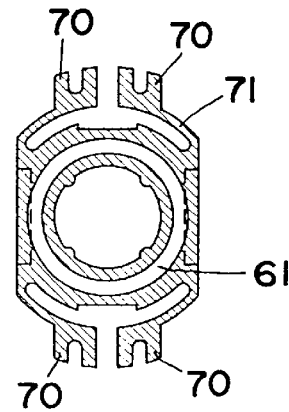
FIG. 16 is a longitudinal sectional view showing the support member and the operating member of the car plug.
Figure 17:
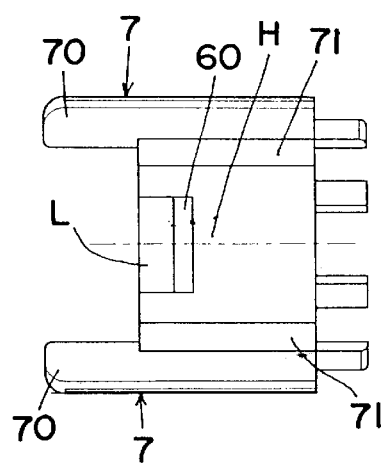
FIG. 17 is a plan view showing the support member and the operating member of the car plug.
Figure 18:
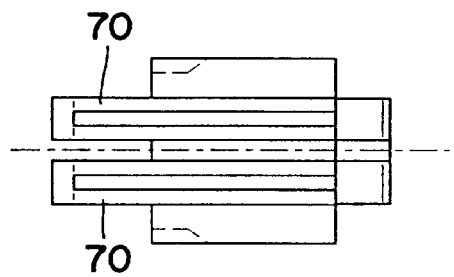
FIG. 18 is a side view showing the support member and the operating member of the car plug.
Figure 19:
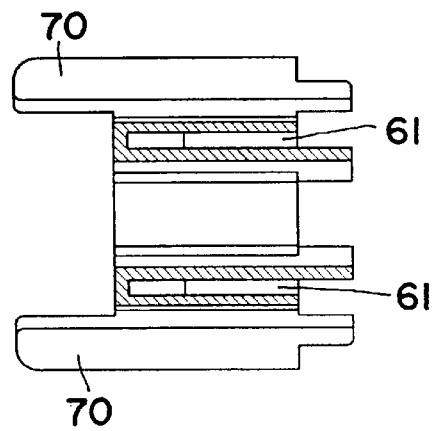
FIG. 19 is a cross-sectional plan view showing the support member and the operating member of the car plug.
Figure 20:
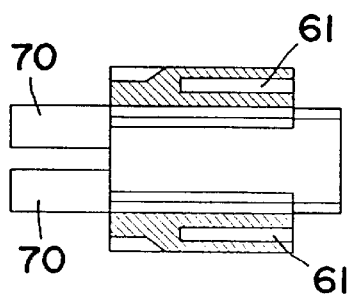
FIG. 20 is a longitudinal sectional side view showing the support member and the operating member of the car plug.
Figure 21:
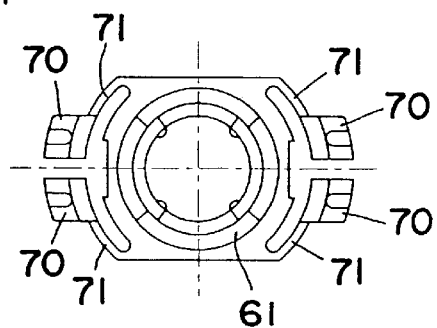
FIG. 21 is a rear view showing the support member and the operating member of the car plug.
Figure 22:
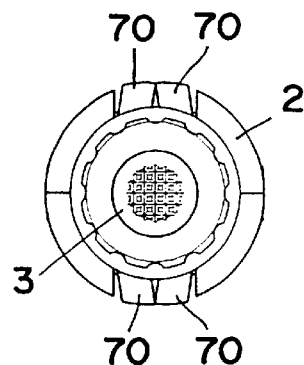
FIG. 22 is a front view showing the car plug inserted into a socket of a small diameter.
Figure 23:
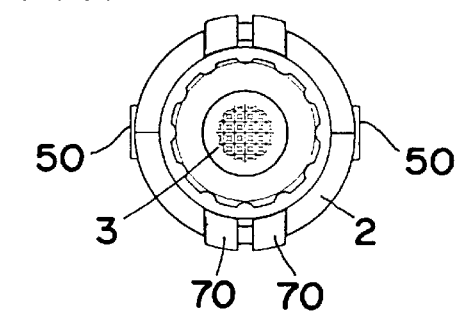
FIG. 23 is a front view showing the car plug inserted into a socket of a large diameter.
Figure 24:
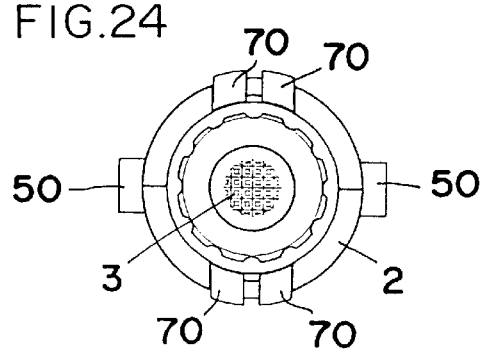
FIG. 24 is a front view showing the car plug before insertion into a socket.

As shown in FIGS. 15, 16 and 21, the operating portions 70, 70 projected through the window holes 21, 21 are supported by arms 71, 71 flexibly bent due to elasticity of the synthetic resin material used for forming the operating member 7 together with the support member a. Thus, when the operating portions are forced from the outer surface of the body 2, the operating portions are displaced in the radial direction relatively to the body 2 due to the flexure of the arm portions 71, 71.

Figure 25:
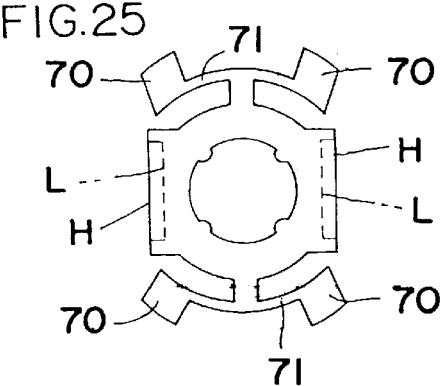
FIG. 25 is a longitudinal sectional front view showing another embodiment of the support member and the operating member of the car plug.

As shown in FIG. 25, in displacement of the operating portions 70, 70 of the operating member 7, the operating portions 70, 70 may be formed on the free ends of a pair of arms 71, 71 such that these arms are projected in the opposite directions, or the operating portions 70, 70 may be formed at the tops of the pair of arms 71, 71 such that these arms are continuously provided in a corrugated form.

As has been described in the foregoing, the car plug A of the present invention has the support member a for switching over the position to support the elastic terminals 5 incorporated in the body 2 so as to switch over the height of the terminal portions 50 projected through the window holes 20 between the higher and lower levels, and the support member a switches over the support position by the operation of the operating member 7 provided on the outer surface of the body 2 such that the operating member is integrated with or integrally connected with the support member to make a slide motion in the longitudinal direction. Therefore, when the car plug is inserted into either of the sockets 1, 1' different from each other in inside diameter, the height of projected terminal portions 50 is automatically switched over through the operation of inserting the car plug into the socket 1 or 1'.

What is claimed is:

1. A car plug, comprising:

a body;

a support member incorporated in the body and supporting elastic terminals so that said support member is made slidable in the longitudinal direction relative to the body;

said support member having higher and lower base surfaces provided longitudinally in parallel to each other on the outer surface of the support member to support the elastic terminals;

said support member being biased by the action of a spring so that said support member is pushed forward;

an operating member incorporated with or integrally connected with said support member so as to make a sliding motion in the longitudinal direction; and said operating member being incorporated with the outer surface of the body such that the front end of said operating member is located ahead of terminal portions of said elastic terminals projected from the body;

wherein the projected height of the terminal portions of said elastic terminals is automatically switched over by the operation of inserting the car plug into a socket for a cigar lighter.

2. A car plug according to claim 1, wherein said operating member provided on the outer surface of the body has operating portions projected from the outer surface of the body and elastically displaced in the radial direction relative to the body.

* * * * *